May 12, 1925.  1,537,360

H. T. F. LUNDBERG ET AL

ORE DETECTOR

Filed Jan. 24, 1919   2 Sheets-Sheet 1

Inventors:
H.T.F. LUNDBERG
H.J.H. NATHORST

George Bayard Jones, Atty.

Inventors:
H. T. F. LUNDBERG
H. J. H. NATHORST

George Bayard Jones, Atty.

Patented May 12, 1925.

1,537,360

UNITED STATES PATENT OFFICE.

HANS TORKEL FREDRIK LUNDBERG, OF LIDINGO VILLASTAD, AND HARRY JOHAN HJALMAR NATHORST, OF STOCKHOLM, SWEDEN, ASSIGNORS TO AKTIEBOLAGET ELEKTRISK MALMLETNING, OF STOCKHOLM, SWEDEN, A CORPORATION OF SWEDEN.

ORE DETECTOR.

Application filed January 24, 1919. Serial No. 272,803.

*To all whom it may concern:*

Be it known that we, HANS TORKEL FREDRIK LUNDBERG and HARRY JOHAN HJALMAR NATHORST, subjects of the King of Sweden, and residents, respectively, of Lidingo Villastad and Stockholm, both in the Kingdom of Sweden, have invented a new and useful Improvement in Ore Detectors, of which the following is a specification.

The present invention relates to an apparatus for discovering and determining electrically the location of veins of ore or mineral. The electrical method of locating ores as at present in use, may be said to be, in the main, a simplification and improvement on the well known method of Daft and Williams. According to this method two primary electrodes contacting with the soil are used, which electrodes are connected to a source of electric current, and two secondary electrodes or so-called searching rods connected to a sensitive receiving apparatus, for instance a telephone receiver or a galvanometer, the said searching rods being placed in contact with the soil at different points between the primary electrodes in order in this manner to ascertain any disturbances in the lines of current between the primary poles due to veins of ore possibly present in the soil. The improvement on the said method hitherto made consists chiefly in this that instead of directly following the lines of current and determining the location of the ore by the disturbances in said lines of current, the equipotential curves are followed whereby the method becomes more objective and thus less dependent on the person making the search.

Figure 1:
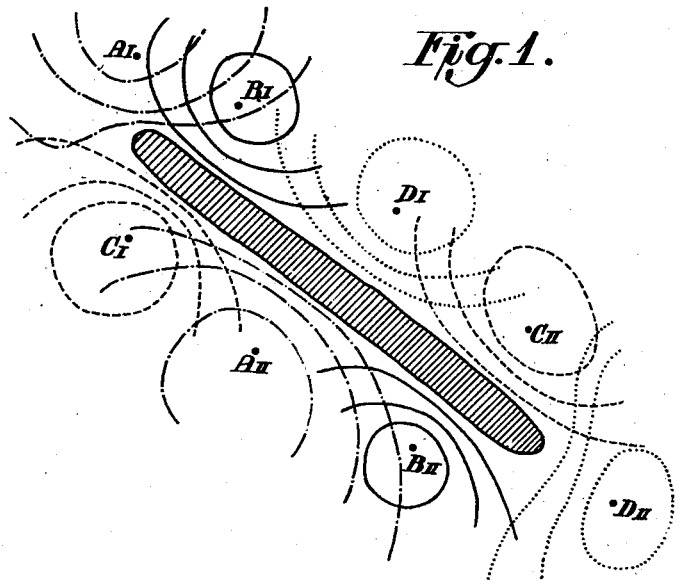
Figure 2:
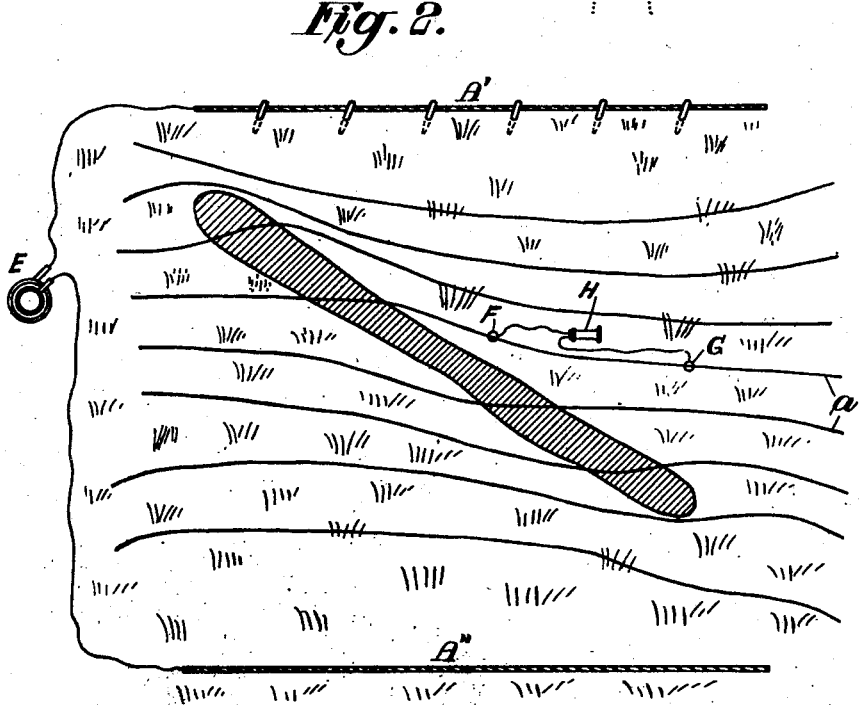
Figure 3:
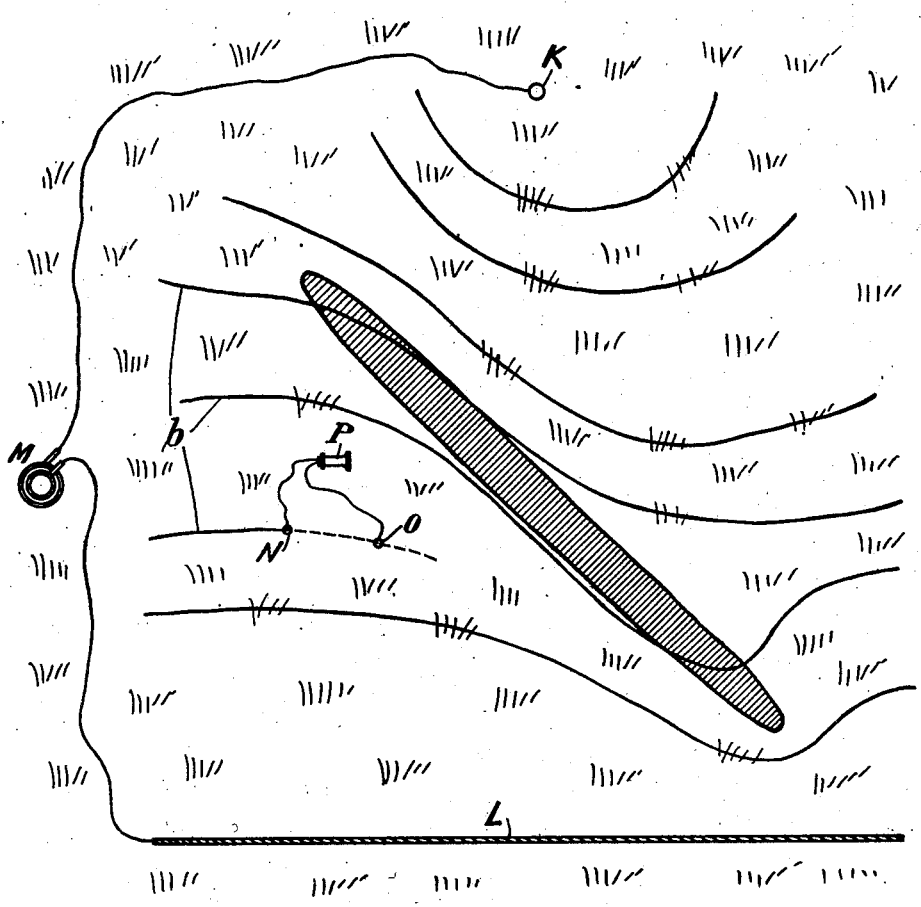

In the accompanying drawing Fig. 1 is a view illustrating diagrammatically the manner of locating a vein of ore by the known method above referred to. Fig. 2 is a diagrammatic view illustrating one embodiment of the present invention, and Fig. 3 is a similar view illustrating a second embodiment.

According to the old method illustrated in Fig. 1, by first placing the primary electrodes at the points $A_I$ and $A_{II}$ and determining the equipotential curves shown in dotted and dashed lines, and afterwards removing the primary electrodes to the points $B_I$, $B_{II}$, $C_I$, $C_{II}$, and $D_I$, $D_{II}$ and tracing the equipotential curves after every such removal, it is possible from the disturbances appearing in respect to these curves to obtain an approximate image of the location of the vein of ore indicated in the drawing by the shaded surface. The said removals of the primary electrodes, however, must be made with a certain discrimination, which fact reduces the objectivity of the method and the carrying out of the method becomes in this manner both circumstantial and time-wasting. A further imperfection of the method is of course also the fact that the results obtained by different placings of the two primary electrodes cannot be mutually connected in any manner, or, in other words, that it is only possible in an exceedingly small number of cases by means of a single placing of the primary electrodes to obtain an idea of the extension of the vein of ore.

The purpose of the apparatus forming the subject of the present invention is to avoid the said inconveniences. The apparatus in question consists broadly in this that one of the primary electrodes or both primary electrodes have a considerable extension in a horizontal direction in proportion to the distance between said primary electrodes, so that they contact with the soil either along a continuous straight or curved line or at a plurality of points on such a line. In this manner the result is attained that the equipotential lines do not form circles in which there will be greater or smaller disturbances due to the influence of the ore, but that it is possible to obtain another more suitable shape of the said lines and also to extend their lengths, as required. The most advantageous shape of the equipotential lines for making observations along a vein of ore is probably in most cases the straight line, when it will be possible to make a continuous observation.

Fig. 2 in the accompanying drawing shows such an embodiment of the invention. The two primary electrodes $A'$ and $A''$ consist in this embodiment of two straight ropes or wires of electrically conductive material which ropes or wires are connected in suitable manner with the soil, either by contacting with the soil along their entire lengths as shown in respect of the electrode $A''$ or at a great number of solitary points as shown in respect of the electrode A'. The electrodes are also connected with a source of current, preferably a source E of alternating current. If there are no disturbances due to veins of ore or other conductive masses in the soil between the two electrodes, perfectly straight equipotential lines $a$ will be obtained in this case when one of the secondary electrodes F is placed in contact with the soil, and the other secondary electrode G is moved over the ground until it arrives at a point where there is no indication in the receiver H connected to said secondary electrodes, of difference of potential between the points of contact with the soil of the electrodes F and G. If again there is an ore in the vicinity of the current-conducting region, the disturbances caused by the ore will be easily detected. It will be understood from Fig. 2 that in such case the location of a vein of ore may be fully determined by a single placing of the primary electrodes.

The local conditions may of course sometimes be such that only one of the primary electrodes can obtain a considerable linear extension, while the other electrode must be polar. In such case the result will probably be somewhat more difficult to interpret, but also in this case a considerable improvement will be obtained.

Fig. 3 in the accompanying drawings shows an embodiment of the invention having a polar electrode K and an electrode L having a considerable extension in horizontal direction and consisting, for instance, of an electrically conducting wire placed in contact with the soil. Said electrodes K and L are connected to a source M of alternating current. The equipotential lines $b$ are obtained in the manner above described by means of two secondary electrodes N and O connected to a sensitive receiving apparatus, such as a telephone receiver P.

We claim:

1. Apparatus for discovering and determining electrically the location of veins of ore or mineral, comprising two primary electrodes adapted to be brought into contact with the soil and connected with a source of electric current, at least one of said primary electrodes having a considerable extension in a horizontal direction in proportion to the distance between said primary electrodes, and two secondary electrodes connected with a sensitive receiving apparatus and adapted to be brought into contact with the soil at different points between the primary electrodes.

2. Apparatus for discovering and determining electrically the location of veins of ore or mineral, comprising two primary electrodes adapted to be brought into contact with the soil and connected with a source of electric current, said primary electrodes having a considerable extension in a horizontal direction in proportion to the distance between said primary electrodes, and two secondary electrodes connected with a sensitive receiving apparatus and adapted to be brought into contact with the soil at different points between the primary electrodes.

3. Apparatus for discovering and determining electrically the location of veins of ore or mineral, comprising two primary electrodes adapted to be brought into contact with the soil and connected with a source of alternating current, at least one of said primary electrodes having a considerable extension in a horizontal direction in proportion to the distance between said primary electrodes, and two secondary electrodes connected with a sensitive receiving apparatus and adapted to be brought into contact with the soil at different points between the primary electrodes.

4. Apparatus for discovering and determining electrically the location of veins of ore or mineral, comprising two primary electrodes adapted to be brought into contact with the soil and connected with a source of electric current, at least one of said primary electrodes having a considerable extension in a horizontal direction in proportion to the distance between said primary electrodes, and a secondary circuit including a sensitive receiving apparatus and located between said primary electrodes.

5. Apparatus for discovering and determining electrically the location of veins of ore or mineral, which includes an elongated electrode adapted to be horizontally disposed when in operative position and to be brought into contact with the soil while arranged substantially parallel thereto.

6. Apparatus for discovering and determining electrically the location of veins of ore or mineral comprising, a primary circuit, a source of current for said primary circuit, a secondary circuit, and an indicator connected with said secondary circuit, said primary circuit including an elongated electrode adapted to be horizontally disposed when in operative position and to be brought into contact with the soil while arranged substantially parallel thereto.

HANS TORKEL FREDRIK LUNDBERG.
HARRY JOHAN HJALMAR NATHORST.